Figure 1:
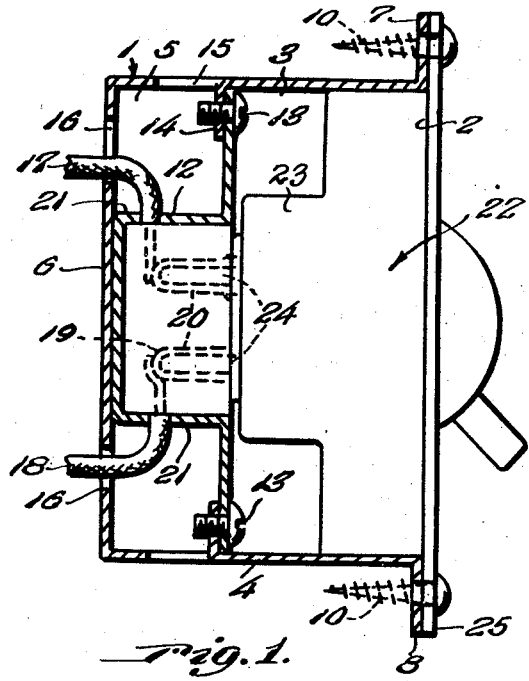

Jan. 6, 1948.  W. J. McCARTNEY  2,433,917
OUTLET BOX AND PLUG IN CONNECTIONS THEREFOR
Filed July 15, 1944

Inventor
William James McCartney
By Clarence A. O'Brien
and Harvey B. Jacobson
Attorneys Patented Jan. 6, 1948

2,433,917

UNITED STATES PATENT OFFICE 2,433,917

OUTLET BOX AND PLUG-IN CONNECTIONS THEREFOR

William James McCartney, San Francisco, Calif.

Application July 15, 1944, Serial No. 545,086

1 Claim. (Cl. 174—53)

My invention relates to improvements in electrical installation outlet boxes and plug-in connections therefor, the primary object in view being to provide simply constructed, inexpensive equipment, of the character specified, which is especially designed to save time and labor in installation, reduce the fire hazard by obviating friction in wiring, and which is furthermore adapted for installation, replacement of parts and plugging in of electrical service lines and switches, all by inexperienced persons and with absolute safety.

Other and subordinate objects are also comprehended by my invention, all of which, together with the precise nature of my improvements, will be readily understood when the succeeding description and claim are read with reference to the drawing accompanying and forming part of this specification.

Figure 2:
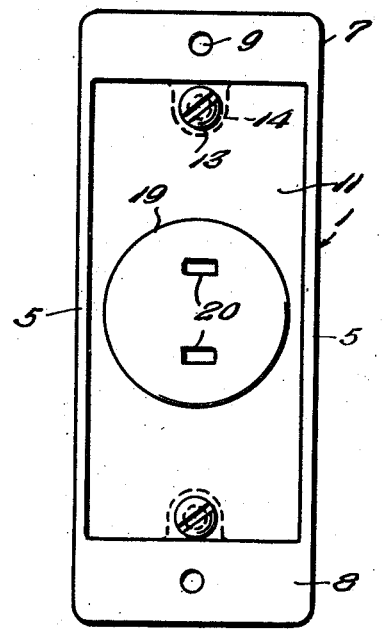
Figure 3:
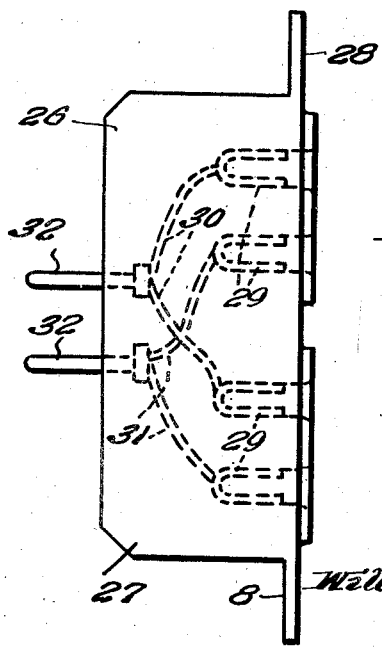

In said drawing:

Figure 1 is a view in longitudinal section of my improved outlet box illustrating a switch unit plugged into the same, Figure 2 is a view in front elevation with the switch unit removed, Figure 3 is a view in side elevation of a socket unit for plugging into the outlet box.

Referring to the drawing by numerals, according to my invention, an elongated, rectangular outlet box 1 is provided having an open front 2, end walls 3, 4, side walls, as at 5, and a back wall 6. The end walls 3, 4 are provided with outstanding, right angled front edge flanges 7, 8 centrally apertured, as at 9, for the passage of attaching screws 10 therethrough.

In the back portion of the box 1 is a transverse partition plate 11 fitting in said box and provided with a reduced, central, cup-like receptacle 12 opening forwardly of the box 1 and fitting flush against the back 6 of said box. The partition plate 11 is detachably attached to said box 1 by screws 13 passing through the ends of said plate and into a pair of ears 14 cut out of the end walls 3, 4 of said box and bent inwardly of the box, the cut-outs forming openings 15 in said ends of said box for the extension of power supply lines therethrough, if desired.

The described box 1, and partition 11, may be formed of any suitable material. A pair of apertures 16 are provided in the back 6 of the box 1 upon opposite sides of the receptacle 12 for the extension of power supply lines 17, 18 from a house circuit or the like into said box between the partition plate 11 and the back 6 of the box. The receptacle 12 contains a cylindrical plug-in socket holder 19 of suitable insulation material and which has suitably fixed therein a pair of the usual prong-receiving sockets 20 to which the lines 17, 18 may be connected in the usual manner, the receptacle 12 being apertured, as at 21, for the extension of said lines 17, 18 into the same.

As shown in Figure 1, a toggle switch unit 22 is provided for plugging into the described outlet box. The switch unit 22 comprises a suitable body 23 of insulation material fitting into the open front of said box 1 and provided with a pair of the usual prongs 24 at the back of said body adapted to fit into the sockets 20. The body 23 is provided at the front of the unit with a flange 25 adapted to fit over the open front of the box 1 to close the same and through which the beforementioned attaching screws 10 are suitably extended to hold said switch unit 22 in place.

As shown in Figure 3, my invention comprehends a socket unit 26 for plugging into the described outlet box 1, in lieu of the switch unit 22, and which is adapted for plugging in thereto a pair of the usual line plugs of commerce, not shown.

The socket unit 26 comprises a body 27 of insulation material adapted to fit into the front of said box 1 and which is provided with a pair of end flanges 28 for attachment of said unit in said box, by the screws 10, in the same manner as described with reference to the switch unit 22. The socket unit 26 embodies in its front side pairs of the usual prong receiving sockets 29 suitably wired internally of the body 26, as indicated by dotted lines in Figure 3, as at 30, 31, to a pair of the usual prongs 32 extending from the back of the body 27 for insertion in the sockets 20.

The foregoing will, it is believed, suffice to impart a clear understanding of my invention both as regards structure, use and the advantages thereof.

Manifestly, the invention, as described, is susceptible of modifications without departing from the inventive concept, and right is herein reserved to such modifications as fall within the scope of the appended claim.

What I claim is:

In an electrical outlet box, having an open front, and end, side and back walls, respectively, a partition plate fitted in said box opposite said back wall and embodying a central cup-like receptacle opening forwardly and having a closed back, a socket holder fitted in said receptacle and having prong receiving sockets embedded therein for the attachment of power lines thereto, said box having apertures therein in the rear of said plate for the extension of power lines therethrough into said box and said receptacle having apertures therein for the extension of said lines therethrough to said socket holder, and a plug-in unit fitted into the front of said box and provided with prongs inserted in said sockets, said unit forming a closure for said box, said box being provided with inturned ears in the end walls thereof bent out of said walls to form said apertures, said partition plate being detachably attached to said ears.

WILLIAM JAMES McCARTNEY.

REFERENCES CITED

The following references are of record in the file of this patent:

UNITED STATES PATENTS

| Number | Name | Date |
|---|---|---|
| 1,587,748 | Benjamin et al. | June 8, 1926 |
| 1,450,310 | Silliman | Apr. 3, 1923 |
| 1,938,309 | Williams | Dec. 5, 1933 |
| 1,551,876 | Hartmann | Sept. 1, 1925 |
| 1,662,275 | Lane | Mar. 13, 1928 |